(12) United States Patent
Good

(10) Patent No.: US 7,040,448 B2
(45) Date of Patent: May 9, 2006

(54) HAND CONTROL MECHANISM TO PRODUCE A SELECTIVELY CHANGEABLE EFFECT ON A CONTINUOUSLY VARIABLE INPUT SHAFT

(75) Inventor: Ervin H. Good, Lititz, PA (US)

(73) Assignee: Schiller-Pfeiffer, Inc., Southhampton, PA (US)

( * ) Notice: Subject to any disclaimer, the term of this patent is extended or adjusted under 35 U.S.C. 154(b) by 314 days.

(21) Appl. No.: 10/461,144

(22) Filed: Jun. 13, 2003

(65) Prior Publication Data

US 2003/0230416 A1 Dec. 18, 2003

Related U.S. Application Data

(60) Provisional application No. 60/389,249, filed on Jun. 17, 2002.

(51) Int. Cl.
*B60K 26/00* (2006.01)

(52) U.S. Cl. .................. 180/334; 180/315; 180/332; 180/336

(58) Field of Classification Search ............... 180/336, 180/335, 315, 332, 334; 74/473.1, 503, 516, 74/518, 523

See application file for complete search history.

(56) References Cited

U.S. PATENT DOCUMENTS

| 5,156,218 A | 10/1992 | Metzler et al. ............ 172/15 |
| 6,162,124 A | 12/2000 | Hiraoka et al. ............ 463/38 |
| 6,237,711 B1 | 5/2001 | Hunt ......................... 180/336 |
| 6,279,937 B1 | 8/2001 | Hunt ......................... 280/336 |
| 6,341,479 B1 | 1/2002 | Scag et al. ................. 56/11.3 |

*Primary Examiner*—Eric Culbreth
(74) *Attorney, Agent, or Firm*—Akin Gump Strauss Hauer & Feld, LLP

(57) ABSTRACT

A hand control mechanism to produce a selectively changeable effect on a continuously variable input shaft is disclosed. The mechanism selectively varies the length of a lever arm to effect a change in the amount of rotation of a continuously variable input shaft of a machine.

18 Claims, 3 Drawing Sheets

HAND CONTROL MECHANISM TO PRODUCE A SELECTIVELY CHANGEABLE EFFECT ON A CONTINUOUSLY VARIABLE INPUT SHAFT

CROSS-REFERENCE TO RELATED APPLICATIONS

This application claims the benefit of U.S. application Ser. No. 60/389,249, filed Jun. 17, 2002.

FIELD OF THE INVENTION

The present invention relates generally to a hand control mechanism, and more particularly to such a mechanism that will produce a selectively changeable effect on a continuously variable input shaft, for example, to stroke and destroke a hydrostatic pump in multiple ways, and even still further to such a mechanism that selectively changes the speed of a hydrostatic transmission on a walk-behind edge-shaping machine.

BACKGROUND OF THE INVENTION

Conventional commercial walk-behind type lawn care and maintenance equipment typically include a plurality of levers and linkages for controlling the various operations and functions of the machine. The invention described herein was developed for use with a commercial edge-shaping machine, such as that generally shown in U.S. Pat. No. 5,156,218 and generally in the figures hereof. Such edge-shaping machines are designed to maneuver and operate around trees, bushes, flowerbeds and other similar ornamental objects normally found in a yard or park. Regarding such edge-shaping machines, and other walk-behind landscaping equipment, a most important characteristic is the ability to change speeds to accommodate varying work conditions and its ability to move from flowerbed to flowerbed, tree to tree, etc. as quickly as possible . . . efficiency of operation having a profound effect on profitability.

Relatively modern walk-behind lawn maintenance equipment uses one of two types of drive systems (1) a mechanical transmission with manually shiftable gears, or (2) a hydrostatic transmission that performs much like an automatic transmission in an automobile. Each of these systems has distinct advantages, but taking all variables into consideration, a hydrostatic transmission is usually considered to be best by commercial operators. Hydrostatic drives are understood to allow for relatively quick changes of speed.

The present invention is an improvement for equipment with hydrostatic drive systems. There is a need to improve such walk-behind equipment by further reducing the difficulty and time it takes an operator to change speeds and get to neutral and transport modes, thereby improving maneuverability and efficiency.

SUMMARY OF THE INVENTION

It is thus an object of the instant invention to provide a novel hand control mechanism for a walk-behind edge-shaping machine that reduces the difficulty and time it takes an operator to change speeds and get to neutral and transport modes, thereby improving maneuverability and efficiency.

It is another object of this instant invention to provide a novel hand control mechanism that has a selectively changeable effect on a continuously variable input shaft.

It is another object of this invention to provide a hand control mechanism that will stroke and destroke a continuously variable input shaft by selectively variable amounts.

It is another object of this invention to provide a hand control mechanism for a steering handle of a self-propelled walk-behind machine that will stroke and destroke the hydrostatic transmission in selectively variable amounts, thus controlling the speed of travel of the machine.

It is a further object of this invention to provide a hand control mechanism for a landscape edging machine that will stroke and destroke the hydrostatic transmission in selectively variable amounts, thus controlling the ground speed of the machine.

It is a still further object of this instant invention to provide a hand control mechanism that selectively varies the length of a lever arm to change the amount of rotation of a continuously variable input shaft of a machine.

These and other objects are achieved by providing a hand control mechanism to produce a selectively changeable effect on a continuously variable input shaft. The mechanism selectively varies the length of a lever arm to affect a change in the amount of rotation of a continuously variable input shaft of a machine.

DETAILED DESCRIPTION OF THE PREFERRED EMBODIMENT

In general terms, the invention to be described is to a hand control mechanism to produce a selectively changeable effect on a continuously variable input shaft. More specifically, there will be described and claimed a hand control mechanism that will stroke and destroke a continuously variable input shaft by selectively variable amounts to, for example, control the ground speed and direction of a walk-behind landscaping machine.

The terms "left" and "right", "up" or "upwardly" and "down" or "downwardly" are used herein for clarity and ease of description only. They refer to directions as relate to the machine, setting on the ground, facing in the normal direction of travel while in operation.

Figure 1:
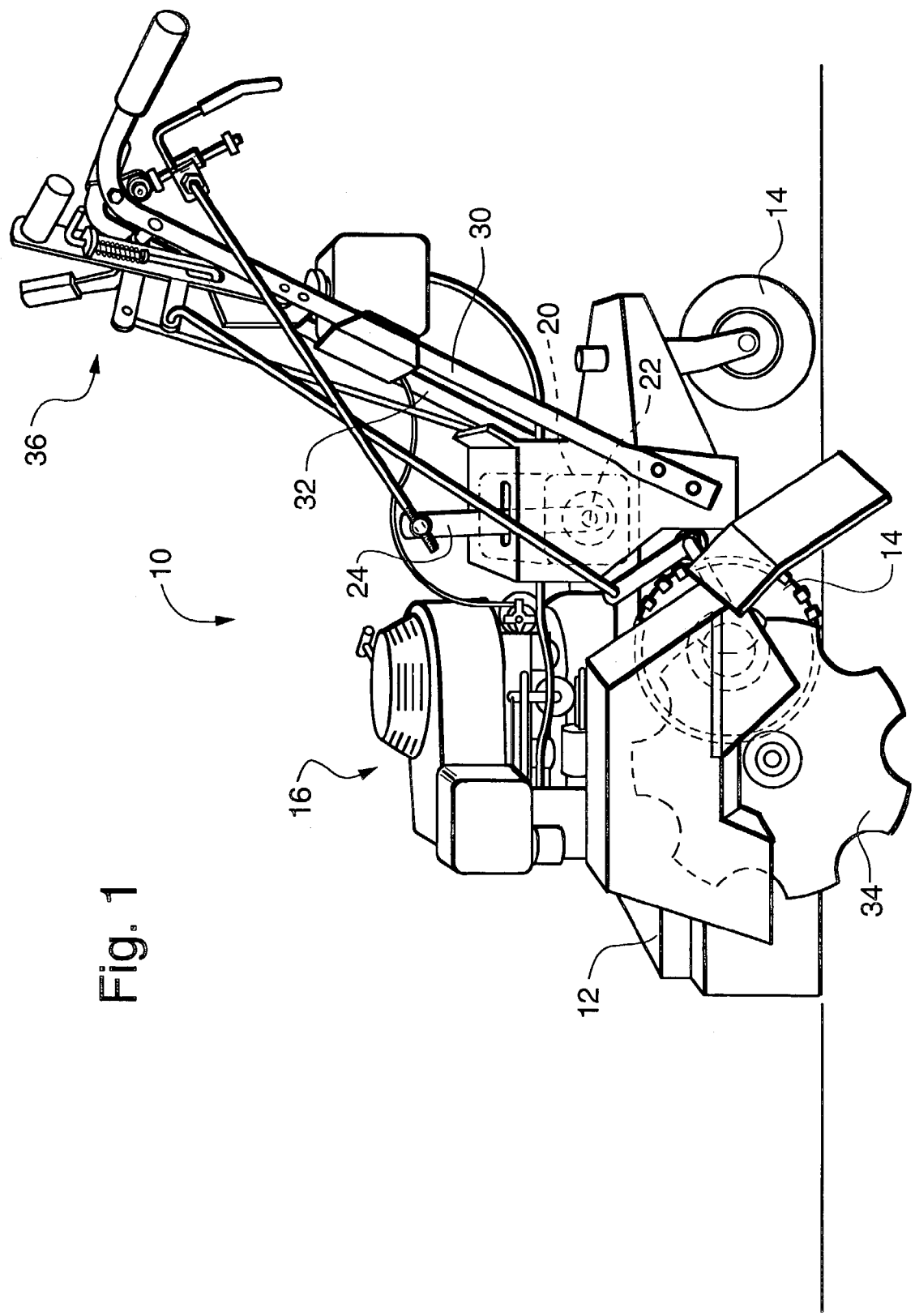
FIG. 1 is a partial perspective side elevational view of a walk-behind edge-shaping machine showing the instant invention and other controls necessary to operate the machine.
Figure 3:
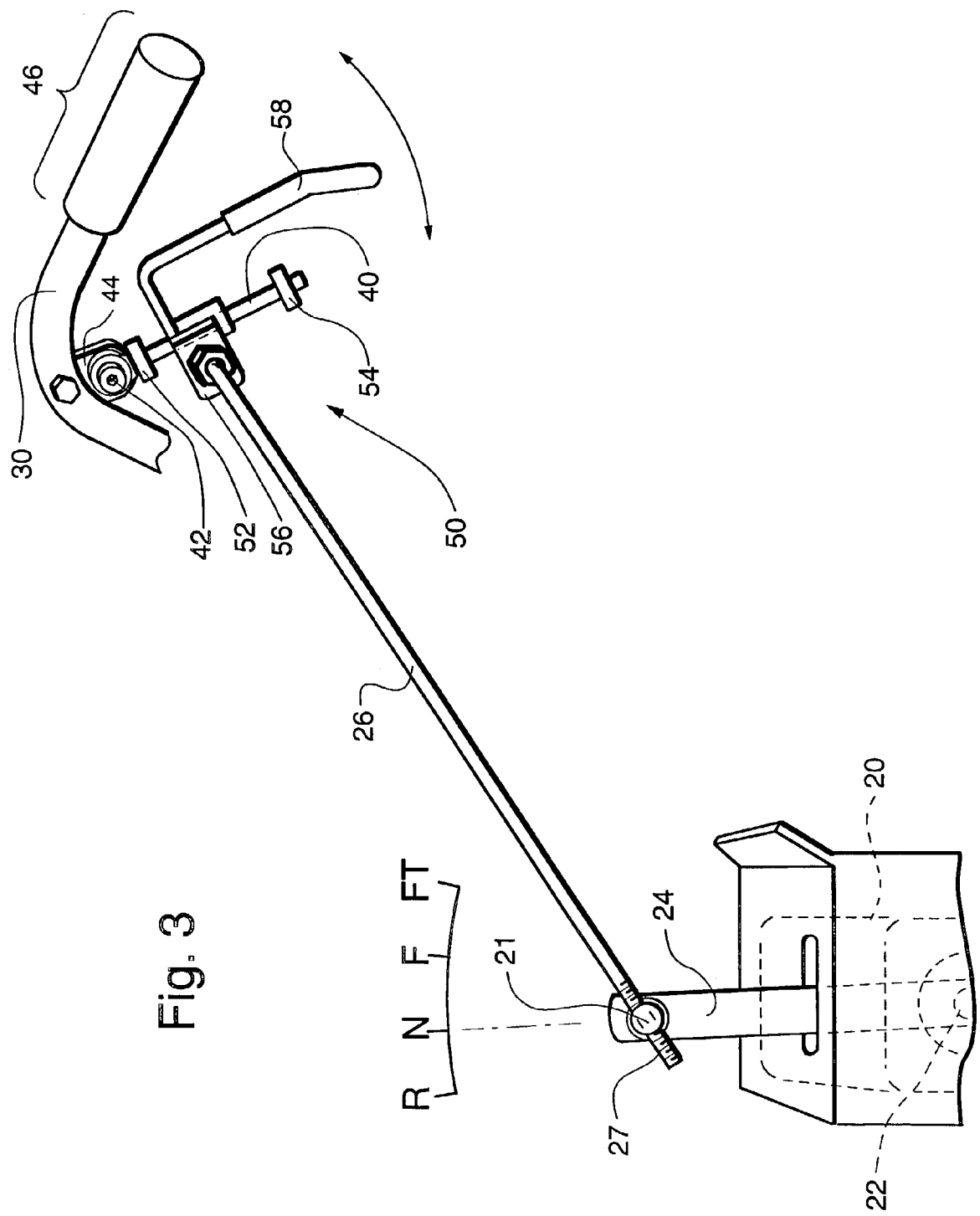
FIG. 3 is a magnified side elevational view of the variable control shown in FIG. 2 of the walk-behind edge-shaping machine of FIG. 1.

Referring now to FIG. 1, a general description of a preferred embodiment will be described. This embodiment is incorporated in a walk-behind landscaping machine 10, known in the industry as an edge-shaper. Edge-shaper 10 comprises a main frame 12 supported by wheels 14; in this case two drive wheels and a trailing caster. An internal combustion engine 16 is affixed to the main frame 12 and drivenly connected to a hydrostatic pump 20 (serving as a hydrostatic transmission). Pump 20 includes a continuously variable input shaft 22 that, when stroked in the clockwise direction, increases the ground speed of the machine 10 and when destroked in the counterclockwise direction, decreases the ground speed, eventually moving into neutral and then reverse modes (as shown in FIG. 3). A pair of handlebars 30, 32 is affixed to main frame 12 and extends upwardly and rearwardly therefrom to provide directional manipulation of edge-shaper 10 by an operator.

A plurality of hand-operated controls, generally shown in FIG. 1 by the reference numeral 36, manipulate functional components of the edge-shaper not directly required by or influential with regard to the instant invention, such as, for example, the depth and angle of cut of blade 34, engagement of the cutting blade power, and the like. These controls are shown in this figure for background and clarity, and will not be further described.

Figure 2:
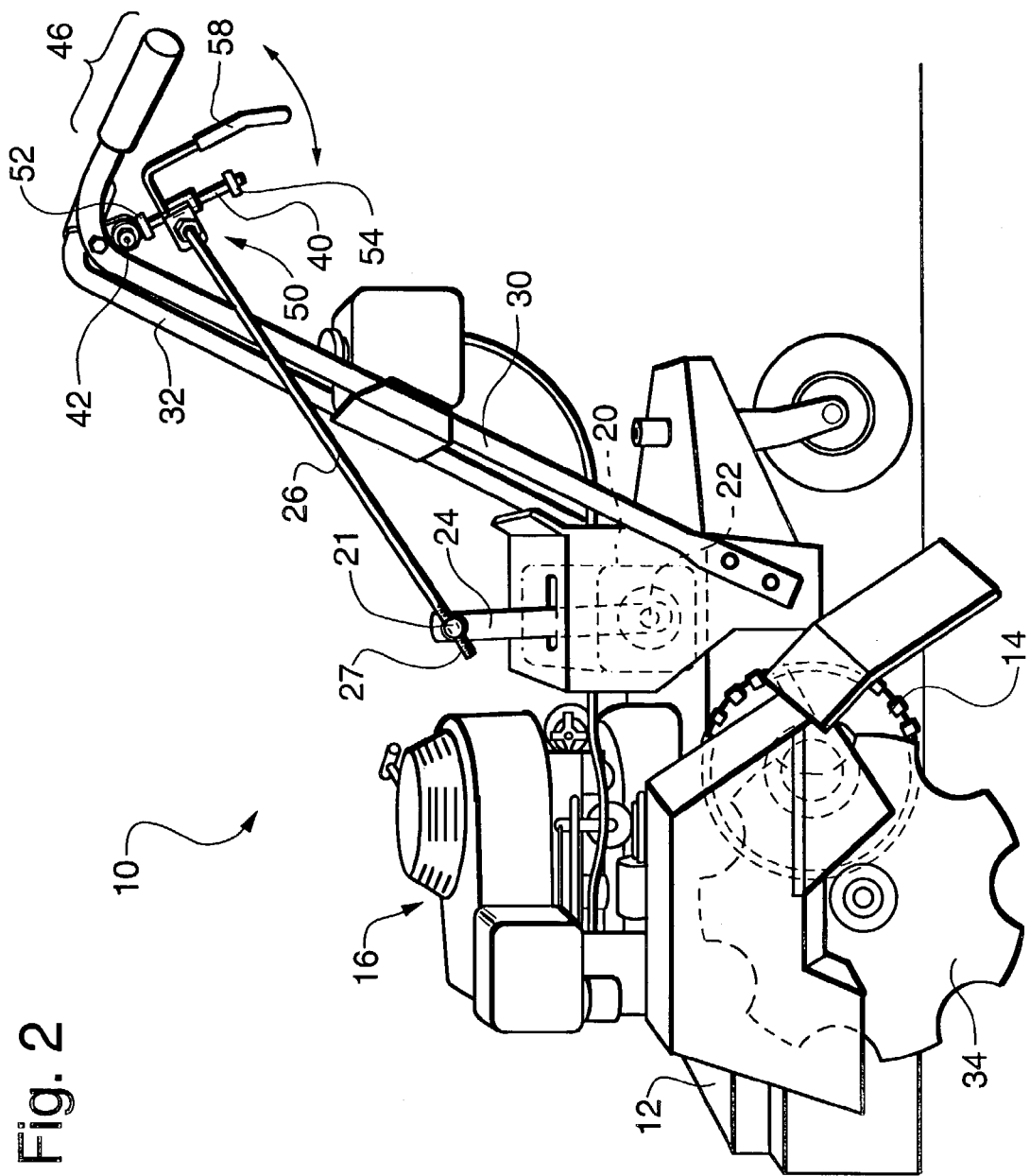
FIG. 2 is a partial perspective side elevational view of the walk-behind edge-shaping machine of FIG. 1, with all controls removed for clarity, except for the variable control of the instant invention.

Referring now more particularly to FIGS. 2 and 3, a simplified view of the inventive control will be described. A slide bar 40, most effectively in the form of a rod, is pivotably affixed at 42 to a strap 44 that is, in turn, affixed to handlebar 30. Slide bar 40 thus pivots in one dimensional plane only, i.e., toward and away from the end portion 46 of handlebar 30. An adjustment member 50 (either fabricated or cast) is slidably mounted on slide bar 40 and selectively movable there along between locking collars 52, 54. Locking collars 52, 54 are movable along slide bar 40 and selectively positioned and affixed thereto by setscrews (not shown). Adjustment member 50 includes a flange 56 affixed thereto and protruding away from the pivot path of slide bar 40. Flange 56 includes a hole therethrough for purposes to be discussed further below. Adjustment member 50 further includes a control handle 58 affixed thereto and extending away therefrom opposite flange 56 and such that it somewhat parallels the end portion 46 of handlebar 30. Movement of control handle 58 causes adjustment member 50 and slide bar 40 to pivot about pivot point 42.

The variable input shaft 22 of hydraulic transmission 20 has rigidly affixed thereto a transfer arm 24 extending upwardly along the side of the transmission. Movement of the transfer arm rotates input shaft 22 partially about its longitudinal axis (which is generally transverse to the direction of travel of the edge-shaper) to, in this embodiment, increase or decrease the ground speed of edge-shaper 10.

An elongated link 26 is pivotably affixed at a first end to flange 56 on adjustment member 50, and pivotably adjustably affixed at the other end to transfer arm 24. Thus, activation of the control handle 58 (pulling control handle 58 toward end portion 46 of handlebar 30) causes slide 40 bar and adjustment member 50 to pivot about pivot point 42, moving link 26 and transfer arm 24, rotating shaft 22 and affecting the ground speed of edge-shaper 10. Link 26 is attached to transfer arm 24 by pivot pin 21 that has an expanded head on one end and a hole therethrough for a cotter pin. A threaded hole through the head of pin 21 accepts the threaded end portion 27 of link 26, thus allowing adjustment of the effective length of link 26. The connection between link 26 and transfer arm 24 may be of many different configurations; that shown and described being only one possibility.

Moving adjustment member 50 to a different position along slide bar 40 changes the distance between the flange 56 and the pivot point 42. As can be seen, this variation of distance changes the amount of rotation of shaft 22 with a given movement of control handle 58. The control mechanism is operated by hand, i.e., the operator has a hand on the end portion 46 of the handlebar 30 in such a way that one or more of the fingers of the left hand may engage the control handle 58 (pull to end portion 46) to move the edge-shaper forward. Thus, this control mechanism operates somewhat like a transmission in that positioning the adjustment member 50 near pivot point 42, and activating the control handle 58 toward the end portion 46 moves the machine forward at a speed directly related to the rotation of the input shaft 22. Similarly, moving the adjustment member 50 away from pivot point 42 toward the locking collar 54 and moving the control handle 58 toward the end portion 46, rotates the shaft 22 a greater distance compared to when the adjustment member 50 is positioned near the pivot point 42, resulting in a higher forward speed because the transfer arm 24 is pivoted a greater distance toward the handlebar 30. In this embodiment, for example, with the adjustment member 50 near the pivot point 42, the machine might move in the range of 0 to 2 mph (operating speed), and in the outer position where the adjustment member 50 is positioned near the locking collar 54, the speed might be in the range of 0 to 8 mph (transport speed).

The axis of slide bar 40 is generally parallel to handle portion 56 of the handlebar 30 and positioned such that movement of adjustment member 50 along slide bar 40 does not significantly change the position of transfer arm 24. Hence, movement of the adjustment member 50 is accomplished without causing movement of edge-shaper until and unless control handle 58 is engaged and moved toward the handlebar 30.

FIG. 3 is an even still further simplified view of the novel structure of the instant invention. An important characteristic shown in this figure, and not discussed in detail above, relates to the neutral and reverse modes of operation. The linkages and components are initially adjusted such that the transmission 20 is in the neutral position or mode. By moving control handle 58 in a counter-clockwise direction, the edge-shaper moves forward. If the control handle is pushed in a clockwise direction, it will move into a reverse mode, causing the machine to move slowly backward. While the option to move into reverse is not required for operation of the machine, it is a valuable and useful feature that greatly simplifies maneuverability.

Many conventional elements or accessories known and used under normal circumstances have not be shown or discussed, but certainly would be employed under normal operating conditions.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. The preferred embodiment described is to a landscape edging machine; however, the principles of the invention will have equal applicability to other landscaping machines that require ground clearance for efficient and effective operation. Accordingly, the following claims are intended to protect the invention broadly as well as in the specific form shown.

The invention claimed is:

1. A control mechanism to produce a selectively changeable effect on a continuously variable input shaft, the input shaft forming part of another mechanism which is supported by a support structure, the control mechanism being operable by hand, the control mechanism comprising: a first link having a first end and a remote second end, said first link affixed at said first end thereof to said input shaft such that said first link may be rotated in a first plane about a first pivot point, causing a corresponding rotation of said input shaft; a slide bar having a first end and a second remote end, said slide bar affixed at said first end thereof to said support structure for pivotable movement generally in said first plane about a second pivot point; an adjustment member attached to said slide bar for selectable and slidable movement therealong between said first and second ends of said slide bar; a second rigid link having a first end and a remote second end, said second link pivotably affixed, about a third pivot point, at the first end thereof to said second end of said first link; said second rigid link pivotably affixed about a fourth pivot point at the second end thereof to said adjustment member; a manually-engagable handle affixed to said adjustment member, whereby movement of said handle also moves said adjustment member generally in said first plane; the relationship among the first, second, third and fourth pivot points such that movement of said handle in said first plane causes said adjustment member and second link to move in said first plane and rotate said first link and input shaft a first distance, and substantially the same movement of said handle after relocation of said adjustment member to a different position along said slide bar results in rotation of said first link and input shaft a second distance, different from said first distance.

2. The control mechanism of claim 1, wherein the second end of said second rigid link may be moved along the slide bar toward and away from the second pivot point such that the relative movement between the slide bar and the second end of the first link may be selectively altered.

3. The control mechanism of claim 2, wherein said input shaft controls the speed of a drive wheel of a walk-behind landscaping machine.

4. The control mechanism of claim 3, wherein said slide bar is a rod.

5. The control mechanism of claim 3, wherein said adjustment member may be adjustably affixed to said slide bar at any location along a length of said slide bar.

6. A self-propelled landscaping machine having a support frame with generally rearwardly extending handlebars and at least one pair of drive wheels, a ground-engaging implement; an engine mounted on said support frame, a hydrostatic transmission receiving input from said engine and providing output to said drive wheels and said implement, said transmission having a continuously variable input shaft for controlling the direction and speed of at least said drive wheels, a control mechanism for said transmission comprising: a first link having a first end and a remote second end, said first link affixed at said first end thereof to said input shaft such that said first link may be rotated in a first plane about a first pivot point, causing a corresponding rotation of said input shaft; a slide bar having a first end and a second remote end, said slide bar affixed at said first end thereof to one of said handlebars for pivotable movement generally in said first plane about a second pivot point; an adjustment member attached to said slide bar for selectable and slidable movement therealong between said first and second ends of said slide bar; a second rigid link having a first end and a remote second end, said second link pivotably affixed, about a third pivot point, at the first end thereof to said second end of said first link; said second rigid link pivotably affixed about a fourth pivot point at the second end thereof to said adjustment member; a manually-engagable handle affixed to said adjustment member, whereby movement of said handle also moves said adjustment member generally in said first plane; the relationship among the first, second, third and fourth pivot points such that movement of said handle in said first plane causes said adjustment member and second link to move in said first plane and rotate said first link and input shaft a first distance, and substantially the same of said handle after relocation of said adjustment member to a different position along said slide bar results in rotation of said first link and input shaft a second distance, different from said first distance.

7. The self-propelled landscaping machine of claim 6 wherein said first link, and thus said input shaft, are movable between locations of activation corresponding to reverse, neutral, forward and transport.

8. The self-propelled landscaping machine of claim 7, wherein the second end of said second rigid link may be moved along the slide bar toward and away from the second pivot point such that the relative movement between the slide bar and the second end of the first link may be selectively altered.

9. The self-propelled landscaping machine of claim 8, wherein said input shaft controls the speed of a drive wheel of the landscaping machine said landscaping machine being a walk-behind landscaping machine.

10. The self-propelled landscaping machine of claim 9, wherein said slide bar is a rod.

11. The self-propelled landscaping machine of claim 10, wherein said adjustment member may be adjustably affixed to said slide bar at any location along the effective length of said slide bar.

12. The self-propelled landscaping machine of claim 10, wherein said ground-engaging implement is a generally vertical cutting blade and said landscaping machine is an edge-shaper.

13. A self-propelled edge-shaper having a support frame with generally rearwardly extending handlebars and at least one pair of drive wheels, a ground-engaging implement; said implement being a cutting blade an engine mounted on said support frame, a hydrostatic transmission receiving input from said engine and providing output to said drive wheels and said cutting blade, said transmission having a continuously variable input shaft for controlling the direction and speed of at least said drive wheels, a control mechanism for said transmission, comprising: a first link having a first end and a remote second end, said first link affixed at said first end thereof to said input shaft such that said first link may be rotated in a first plane about a first pivot point, causing a corresponding rotation of said input shaft; a slide bar having a first end and a second remote end, said slide bar affixed at said first end thereof to one of said handlebars for pivotable movement generally in said first plane about a second pivot point; an adjustment member attached to said slide bar for selectable and slidable movement therealong between said first and second ends of said slide bar; a second rigid link having a first end and a remote second end, said second link pivotably affixed, about a third pivot point, at the first end thereof to said second end of said first link; said second rigid link pivotably affixed about a fourth pivot point at the second end thereof to said adjustment member; a manually-engagable handle affixed to said adjustment member, whereby movement of said handle also moves said adjustment member generally in said first plane; the relationship among the first, second, third and fourth pivot points such that movement of said handle in said first plane causes said adjustment member and second link to move in said first plane and rotate said first link and input shaft a first distance, and substantially the same movement of said handle after relocation of said adjustment member to a different position along said slide bar results in rotation of said first link and input shaft a second distance, different from said first distance.

14. The self-propelled edge-shaper of claim 13 wherein said first link and thus said input shaft are movable between locations of activation to actuate a hydrostatic pump to reverse, neutral, forward and transport modes.

15. The self-propelled edge-shaper of claim 14, wherein the second end of said second rigid link may be moved along the slide bar toward and away from the second pivot point such that relative movement between the slide bar and the second end of the first link may be selectively altered.

16. The self-propelled edge-shaper of claim 15, wherein said slide bar is a rod.

17. The self-propelled edge-shaper of claim 16, wherein said adjustment member may be adjustably affixed to said slide bar at any location along the effective length of said slide bar.

18. The self-propelled edge-shaper of claim 17, wherein said cutting blade is generally vertical and cupped.

* * * * *